Jan. 7, 1958 R. F. DEYKIN 2,818,798
POWER PRESSES
Filed Nov. 29, 1954 3 Sheets-Sheet 1
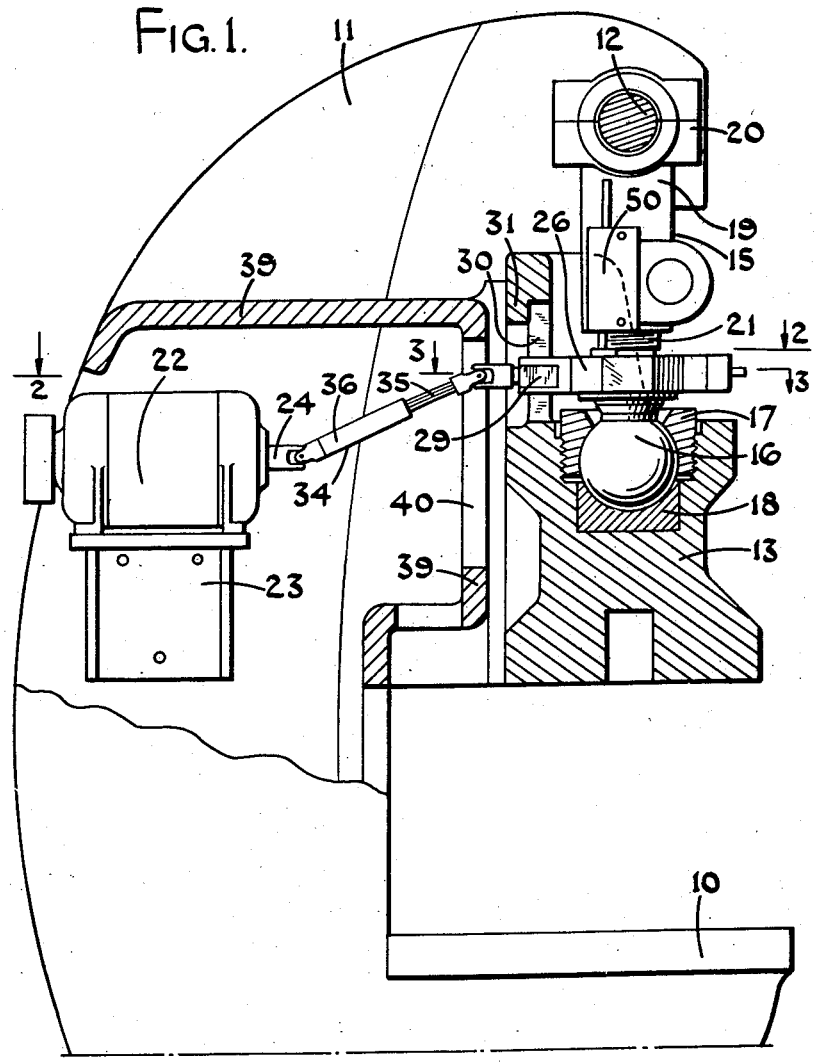
INVENTOR
Ronald Frederick Deykin.
BY
Richardson, Davidson Madon ATTORNEYS.

Jan. 7, 1958 R. F. DEYKIN 2,818,798
POWER PRESSES
Filed Nov. 29, 1954 3 Sheets-Sheet 2
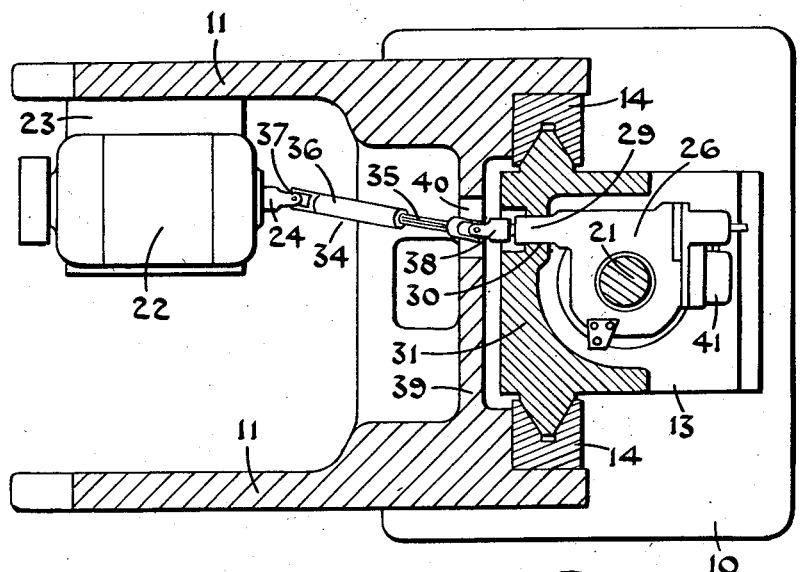
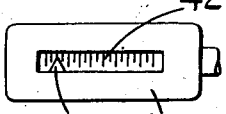
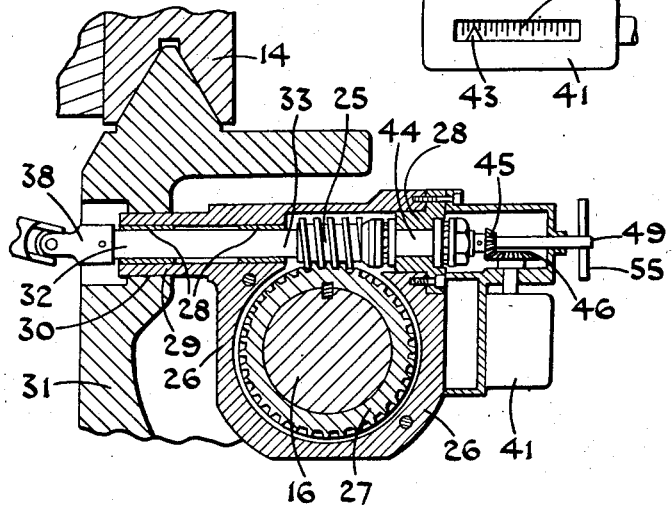
INVENTOR.
Ronald Frederick Deykin
BY
Richardson, David and his ndm
ATTORNEYS Jan. 7, 1958 R. F. DEYKIN 2,818,798
POWER PRESSES
Filed Nov. 29, 1954 3 Sheets-Sheet 3
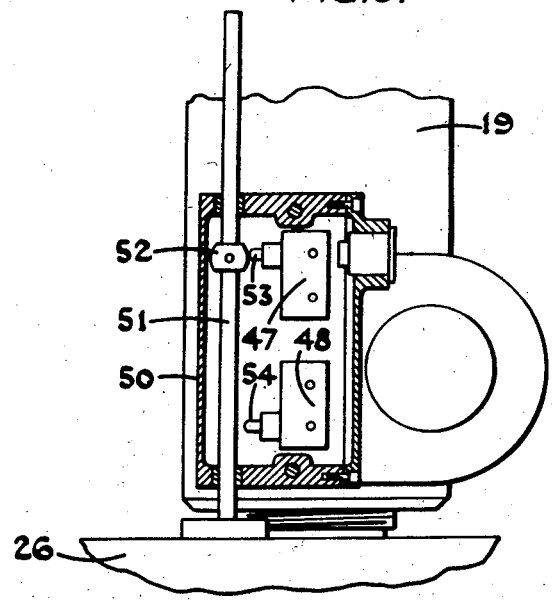
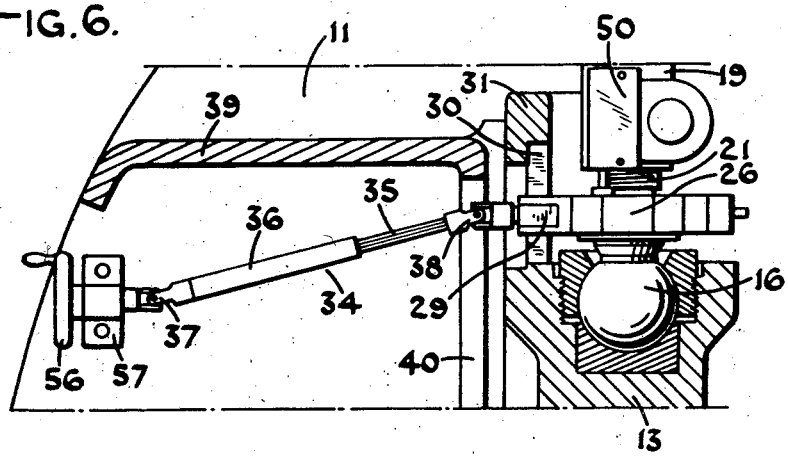
INVENTOR.
Ronald Frederick Deykin.
BY
Richardson, David and Norton
his ATTORNEYS.

United States Patent Office 2,818,798
Patented Jan. 7, 1958

2,818,798

POWER PRESSES

Ronald Frederick Deykin, Erdington, Birmingham, England, assignor to Hordern, Mason and Edwards Limited, Birmingham, England, a British company Application November 29, 1954, Serial No. 471,873

Claims priority, application Great Britain December 7, 1953

7 Claims. (Cl. 100—257)

The present invention relates to power presses of the kind wherein a reciprocating tool carrying member hereinafter termed the ram is driven from a rotary member of the crank, eccentric or cam type hereinafter referred to as a crank, through the intermediary of a connecting rod, and is applicable to presses wherein the ram is driven by a single connecting rod.

The term "connecting rod" is used in a broad sense to denote any suitable form of connecting member which need not necessarily be of elongated or rod-like form.

In power presses of this kind the ram is usually required to be adjustable in position towards and away from the bed or table of the press for any given angular position of the crank so as to vary the distance which separates the bed or table of the press and the ram at the ends of its working stroke.

This is sometimes done by providing the connecting rod with an adjusting member having a screw-threaded connection either with the part of the connecting rod coupled to the crank or with the part of the connecting rod coupled to the ram or with both such parts, in the latter case the screw threads being aligned and of opposite hands, so that a rotation of the adjusting member in all cases produces a lengthening or shortening of the connecting rod as may be required. Instead of providing a two part connecting rod with adjusting member forming a coupling between these parts, another arrangement applicable to constructions wherein a ball and socket joint is used between the ram and connecting rod, is to form one part of the connecting rod with an internally threaded screw socket and the other part with a screw threaded shank entering into said socket which is provided with clamping or retaining means for securing the two parts against relative rotation in any adjusted position in which they may be set.

In order to relieve the operator of the physical exertions required to perform this adjustment manually some constructions of press include an electric motor connected operatively with the adjusting member to rotate same to the position required.

Hitherto, motor driven adjusting members have been confined to presses having a single connection between the ram and crank to those presses in which the connection between the ram and connecting rod is in the form of a part-cylindrical knuckle and a part-cylindrical seating. The reason for this is that in such constructions the part of the connecting rod connected with the ram is automatically restrained against rotation and does not therefore tend to drift round with the adjusting member upon rotation of the latter. Consequently, the torque reaction of the transmission element co-operating with the adjustment member may be borne by this non-rotatable part of the connecting rod. Furthermore, since this non-rotatable part, the adjusting member, and the part of the connecting rod coupled to the crank, remain fixed relatively to each other despite collective movement as a unit during operation of the machine, no appreciable difficulty is encountered in mounting the transmission element which drives the adjusting member in a support which is fixed to the non-rotatable part of the connecting rod.

In presses wherein the ram is of considerable width and is driven by two connecting rods disposed on or near respective sides of the ram, the difficulty of providing a drive from a motor to adjusting members associated with the respective connecting rods is simplified because it is customary to provide a transverse shaft operatively connecting the two adjusting members and journalled in suitable bearings on the ram itself, this shaft thus itself constituting a means whereby torque reaction is automatically resisted and it is merely necessary to arrange a suitable drive to this shaft. Sometimes this is done by mounting the motor itself upon the ram and sometimes the motor is mounted on the outer side of one of the side ram members of the press and connected to the transverse shaft through chain and sprocket or other suitable transmission means.

One object of the present invention is to provide an improved adjustment mechanism applicable to presses wherein the ram is driven by a single connecting rod including those wherein the joint between the connecting rod and the ram is of the ball and socket type or is otherwise so constructed that it does not of itself restrain the part of the connecting rod concerned against rotation relatively to the ram about an axis extending longitudinally of the connecting rod.

A further object of the invention is to provide a torque anchor means for restraining bodily rotation in a planetary manner of a driving gear about a driven gear with which it meshes and which in turn drives one of the rotatable components of a device for lengthening and shortening the connecting rod thereby permitting the driving gear to be connected to a rotary operating device on the frame of the press by an extensible and universally jointed shaft which of itself cannot act as a torque anchor means.

Yet another object is to provide a torque anchor means adapted to perform the above stated function and which is separated from the load carrying joint between the connecting rod and the ram so that the risk that the elements of the torque anchor means may be subjected to high stresses during the working of the press is materially reduced.

Yet another object of the invention is to provide a torque anchor means which is simple, robust and hence reliable in operation which is capable of being applied, without major modifications of design, to a wide variety of presses of differing constructions.

Yet another object of the invention is to provide in association with the torque anchor means above referred to a driving motor or other rotary driving device and transmission means connecting same to one of the relatively rotatable components of a device for lengthening and shortening the connecting rod in a manner such that the driving motor or operating device and the transmission means do not obstruct access to the ram of the press or to the connecting rod from the front of the press.

Preferred embodiments of the invention will now be described by way of example with reference to the accompanying drawings wherein is shown in:

Figure 1 a press of the kind specified having one construction of adjustment means in accordance with the invention.

Figure 2 is a cross sectional view on the line 2—2 of Figure 1.

Figure 3 is a fragmentary view in section on the line 3—3 of Figure 1.

Figure 4 is a fragmentary view in front elevation illustrating the indicator provided.

Figure 5 is a fragmentary view in front elevation and partly in cross section showing the mounting of limit switches and the actuating member therefor and Figure 6 is a fragmentary view corresponding to Figure 2 showing an alternative operation of the adjustment device by manually operable means.

In the particular construction illustrated the press may have a bed or table 10 (hereinafter referred to as a table) on each side of which are arranged upwardly extending side plates 11 supporting at their upper ends a horizontal crank shaft 12. The ram 13 of the press may be mounted in slides 14 above the table 10 and may be driven from the crank 12 by means of a connecting rod 15 the lower end of which is coupled with the ram through a ball and socket joint the ball component 16 being part of the lower end of the connecting rod, and the socket component consisting of elements 17 and 18 being mounted in the ram 13.

In order to obtain adjustment of the initial position of the ram 13 relatively to the table 10 the connecting rod may be formed in two parts the upper part 19 being non-rotatable about its own longitudinal axis by virtue of its attachment through a coupling 20 encircling the crank 12 this non-rotatable upper part 19 having at its lower end an internally screw threaded socket.

The lower part of the connecting rod may be constituted by the ball component 16 of the ball and socket joint and the shank of this ball component may be threaded externally as seen at 21 to engage cooperatively with the socket of the upper part 19 of the connecting rod, so as to constitute a screw and nut mechanism adapted to effect a lengthening or shortening of the connecting rod by rotation of the ball component 16.

This adjustment device may be adapted to be operated by an electric motor 22 situated in the rear of the ram and connecting rod assembly and below the level of the crank shaft 12.

The motor may be mounted upon a bracket 23 or other support secured to the inner face of one or both side plates 11 or alternatively the motor may be secured directly to the inner side face of one of these side plates.

The driving shaft 24 of the motor, (or the output shaft of a reduction gear box through which the drive from the motor may if desired proceed) is directly towards the front of the press, and is coupled thereto by forwardly extending transmission means.

This transmission means may include a driving member in the form of a worm 25 mounted in a supporting member in the form of a housing 26 enclosing a worm-wheel 27 or gear keyed or otherwise fixed to the rotatable ball component 16 of the adjustment device, this housing having aligned bearings 28 for supporting a spindle 33 for the driving member.

When a worm and worm-wheel are employed the aligned bearings 28 of the housing may lie to one side of the shank of the ball component 16, as viewed in plan, the centre line of these bearings extending fore and aft of the press. At one end of the spindle 33 the bearings 28 are carried in a tubular extension 29 of the housing which is adapted to constitute a torque anchor by being received in a vertically extending slot or guide 30 formed in an adjacent upwardly extending rear wall or web 31 of the ram.

It will be understood that the housing 26 as a whole is mounted upon the shank of the ball component 16 and will thus move bodily therewith during operation of the press, this movement consisting of a translatory and oscillatory component being unrestrained by the torque anchor connection since the tubular extension 29 will be free to swing in a vertical plane in the slot or guide of the wall 31 without actually becoming disengaged therefrom.

The end 32 of the worm spindle 33 which projects from this tubular extension 29 of the housing may be connected to the driving shaft of the motor (or to the output shaft of a reduction gear box associated therewith) through an extensible shaft 34 preferably of the kind comprising telescopically engaged components 35 and 36 splined or otherwise keyed with each other to enable them to transmit torque. The ends of the shaft 34 are connected through universal couplings 37 and 38 to the shaft 24 and spindle 33.

The position of the motor 22 in relation to the supporting housing 26 is preferably chosen so that the output or driving shaft 24 lies at a horizontal level midway or approximately midway between the upper and lower extremes of movement of the supporting housing. If the motor 22 is secured directly to or adjacent to one of the side plates 11 the extensible shaft 34 may also incline inwardly towards the central region of the press as seen in Figure 2, both the motor and the shaft being ordinarily partly or wholly hidden from view by the ram and connecting rod assembly as viewed from the front of the press, and by side plates 11 as viewed from the sides of the press.

The side plates 11 may be connected with each other behind the ram by a transversely extending web or member 39 and in such a construction this web or member would be formed with a vertically extending slot 40 for the passage of the extensible shaft 34 and to permit this to move bodily with the supporting housing.

The supporting housing may conveniently serve as a means by which may be mounted an indicator 41 of any suitable form having a relatively movable dial 42 and pointer 43 or other registration mark. The movable component of these indicator means may be driven from the forward extension 44 of the worm spindle 33 through bevel gears 45 and 46 or other suitable gearing.

If desired, the indicator 41 may be calibrated directly in terms of ram displacement, for example, in one thousandths of an inch from a given datum position of adjustment wherein the ram is either at its highest or lowest point of the adjustment range.

The indicator 41 may be so arranged that it reads zero when the ram is adjusted to the highest point of the adjustment range. When a particular pair of tools are installed in the press and the adjustment mechanism is operated to set these tools in their correct relative positions with the ram at the top of its stroke the reading furnished by the indicator is noted and this may then be stamped or otherwise marked upon the tools so that when they are used subsequently it is merely necessary to bring the adjustment mechanism to the same reading without the necessity of performing a gauging operation which will ordinarily be carried out when first setting the tools.

If desired, manually operable adjustment means may be provided to enable fine adjustments to be made. For example, the forward extension 49 of the worm spindle may be adapted to be rotated by a key and for this purpose may be formed with a squared or other suitable projecting end with which a key can be releasably engaged to turn this spindle by hand. A hand-wheel may be, if desired, permanently mounted on such end as indicated in broken lines at 55.

In order to prevent the adjustment mechanism being operated beyond the limits of the range available, limit switches 47, 48 may be provided for automatically interrupting the supply of current of the motor at the extremities of the range of adjustment.

Conveniently, these switches may be mounted in a casing 50 attached to the non-rotatable upper part 19 of the connecting rod, the switches being spaced apart in a direction lengthwise of the connecting rod.

An actuating member 51 in the form of a rod or bar extending parallel to the axis of the connecting rod may be slidably mounted for endwise movement relatively to the casing 50 and connection made at one end of this bar 51 to the supporting housing 26.

This rod or bar 51 may carry a cam 52 or projection preferably capable of being secured at any required adjusted position along the length of the rod or bar, and co-acting with plungers or operating members 53, 54 on the limit switches 47, 48 at opposite ends of the range of adjustment afforded by the screw and nut mechanism of the connecting rod.

Referring to Figure 6 of the drawings we have shown therein an alternative form of adjustment mechanism wherein like components are designated by the same reference numerals as those applied to Figures 1 to 5. Instead of utilising an electric driving motor 22 to rotate the shaft 34 a manually operable member conveniently in the form of a hand-wheel 56 is provided, this being journalled in a suitable member such as a bracket 57 mounted on the inner face of one of the side plates 11.

What I claim then is:

1. In a power press of the kind comprising a frame, a bed, a ram guided by said frame for reciprocating movement towards and away from said bed, and a power driven crank rotatably journalled in said frame for driving said ram; the combination of a single connecting rod connecting said crank and said ram and including a screw component and a nut component relatively rotatable to effect lengthening and shortening of said connecting rod, a supporting member mounted on said connecting rod and rockable therewith in its plane of movement, torque path of movement of said element on said supporting member and an element on said ram, said elements having respective mutually engaging faces parallel to the path of movement of said element of said supporting member and in consequence of rocking movement of the connecting rod in its own plane but transverse to a path of movement of said element on said supporting member in consequence of rotation of said supporting member on the connecting rod about the axis thereof, so that said supporting member is permitted to rock with said connecting rod but is restrained against relative rotation thereto about said axis, a rotary driving member journalled in said support, gear means operatively connecting said driving member with one of said screw and nut components to rotate same and hold same in the required position of adjustment, means for retaining the other of said components against rotation, a rotary operating device mounted on said frame and an extensible shaft having universal joint means operatively connecting said operating device and said driving member.

2. In a power press of the kind comprising a frame, a bed, a ram guided by said frame for reciprocating movement towards and away from said bed, and a power driven crank rotatably journalled in said frame for driving said ram; the combination of a single connecting rod connecting said crank and said ram and including a screw component and a nut component relatively rotatable to effect lengthening and shortening of said connecting rod, a supporting member mounted on said connecting rod and rockable therewith in its plane of movement, torque anchor means comprising an element on said ram having opposed spaced guide faces parallel to the path of movement of said supporting member, and an element on said supporting member disposed between said guide faces and of a width measured perpendicularly to said faces substantially equal to the spacing between said faces so that said supporting member is permitted to rock with said connecting rod but is restrained against relative rotation thereto about said axis, a rotary driving member journalled in said support, gear means operatively connecting said driving member with one of said screw and nut components to rotate same and hold same in the required position of adjustment, means for retaining the other of said components against rotation, a rotary operating device mounted on said frame and an extensible shaft having universal joint means operatively connecting said operating device and said driving member.

3. In a power press of the kind comprising a frame, a bed, a ram guided by said frame for reciprocating movement towards and away from said bed, and a power driven crank rotatably journalled in said frame for driving said ram; the combination of a single connecting rod connecting said crank and said ram and including a screw component and a nut component relatively rotatable to effect lengthening and shortening of said connecting rod, a supporting member mounted on said connecting rod and rockable therewith in its plane of movement, torque anchor means comprising an element on said ram, having opposed spaced guide faces parallel to the plane in which the connecting rod moves, and an element on said supporting member disposed between said guide faces and of a width measured perpendicularly to said faces substantially equal to the spacing between said faces so that said supporting member is permitted to rock with said connecting rod but is restrained against relative rotation thereto about said axis, a rotary driving member journalled in said support, gear means operatively connecting said driving member with one of said screw and nut components to rotate same and hold same in the required position of adjustment, means for retaining the other of said components against rotation, a rotary operating device mounted on said frame and an extensible shaft having universal joint means operatively connecting said operating device and said driving member.

4. In a power press of the kind comprising a frame, a bed, a ram guided by said frame for reciprocating movement towards and away from said bed, and a power driven crank rotatively journalled in said frame for driving said ram; the combination of a single connecting rod connecting said crank and said ram and including a screw component and a nut component relatively rotatable to effect lengthening and shortening of said connecting rod, a supporting member mounted on said connecting rod and rockable therewith in its plane of movement, torque anchor means comprising an element on said supporting member and an element on said ram, said elements having respective mutually engaging faces parallel to the path of movement of said element on said supporting member in consequence of rocking movement of the connecting rod in its own plane but transverse to a path of movement of said element on said supporting member in consequence of rotation of said supporting member on the connecting rod about the axis thereof so that said supporting member is permitted to rock with said connecting rod but is restrained against relative rotation thereto about said axis, a rotary driving member journalled in said support, a worm on said rotary driving member, a worm wheel on one of said screw and nut components meshing with said worm wheel and in cooperation therewith preventing reversed transmission of motion from the worm wheel to the worm, means for retaining the other of said components against rotation, a driving motor mounted on said frame and an extensible shaft having universal joint means operatively connecting said driving motor and said driving member.

5. In a power press of the kind comprising a frame, a bed, a ram guided by said frame for reciprocating movement towards and away from said bed, and a power driven crank rotatably journalled in said frame for driving said ram; the combination of a single connecting rod connecting said crank and said ram and including a screw component and a nut component relatively rotatable to effect lengthening and shortening of said connecting rod, a supporting member mounted on said connecting rod and rockable therewith in its plane of movement, torque anchor means comprising an element on said ram, at the rear of said supporting member and having opposed spaced guide faces parallel to the plane in which the connecting rod moves, and an element on said supporting member disposed between said guide faces and of a width measured perpendicularly to said faces substantially equal to the spacing between said faces so that said supporting member is permitted to rock with said connecting rod but is restrained against relative rotation thereto about said axis, a rotary driving spindle journalled in said supporting member and extending through said element thereon, so as to be presented rearwardly of said supporting member, a worm wheel on one of said screw and nut components, a worm on said spindle meshing with said worm wheel and in cooperation therewith preventing reversed transmission of motion from the worm wheel to the worm, means for retaining the other of said components against rotation, a driving motor mounted on said frame in the rear of said connecting rod and having its driving shaft disposed at a level about midway between the upper and lower limits of travel of said spindle, and an extensible shaft having universal joint means operatively connecting said shaft and spindle.

6. In a power press of the kind comprising a frame, a bed, a ram guided by said frame for reciprocating movement towards and away from said bed, and a power driven crank rotatably journalled in said frame for driving said ram; the combination of a single connecting rod connecting said crank and said ram and including a screw component and a nut component relatively rotatable to effect lengthening and shortening of said connecting rod, the lower of said components having a ball-end seated in a part spherical socket in said ram, and the upper of said component having a strap extending about said crank to connect it thereto and retain it against rotation about the axis of said connecting rod, a supporting member mounted on said lower component and rockable therewith, torque anchor means comprising an element on said supporting member and an element on said ram, said elements having respective mutually engaging faces parallel to the path of movement of said element on said supporting member and transverse to a circle centred on the axis of said connecting rod and passing through said faces so that said supporting member is permitted to rock with said connecting rod but is restrained against relative rotation thereto about said axis, a rotary driving member journalled in said support, gear means operatively connecting said driving member with said lower component to rotate same and hold same in the required position of adjustment, and a rotary operating device mounted on said frame and an extensible shaft having universal joint means.

7. In a power press of the kind comprising a frame, a bed, a ram guided by said frame for reciprocating movement towards and away from said bed, and a power driven crank rotatably journalled in said frame for driving said ram; the combination of a single connecting rod connecting said crank and said ram and including a screw component and a nut component relatively rotatable to effect lengthening and shortening of said connecting rod, the lower of said components having a ball-end seated in a part spherical socket in said ram, and the upper of said component having a strap extending about said crank to connect it thereto and retain it against rotation about the axis of said connecting rod, a housing mounted on said lower component and rockable therewith, said housing having a tubular extension projecting rearwardly, an upstanding element on said ram in the rear of said housing having a slot therein into which said extension enters and whereof the side faces are spaced apart by a distance only slightly greater than the width of the said tubular extension, said faces being parallel to the plane in which the connecting rod moves, a rotary driving spindle journalled in said tubular extension, a worm wheel on said lower component within said housing, a worm on said spindle meshing with said worm wheel and in cooperation therewith preventing reversed transmission of motion from the worm wheel to the worm, a driving motor mounted on said frame in the rear of said connecting rod and an extensible shaft having universal joint means operatively connecting said motor and said spindle.

References Cited in the file of this patent

UNITED STATES PATENTS

| 2,411,503 | Calleson et al. | Nov. 26, 1946 |
| 2,514,933 | Byerlein | July 11, 1950 |

FOREIGN PATENTS

| 699,025 | Great Britain | Mar. 26, 1952 |